Nov. 18, 1952   R. N. STRAEHL   2,618,687
AMPLIFIER FOR RAIL FLAW DETECTOR MECHANISMS
Filed March 25, 1950   2 SHEETS—SHEET 1

*INVENTOR.*
ROBERT N. STRAEHL
BY
Joseph H. Lipschutz
ATTORNEY.

Nov. 18, 1952   R. N. STRAEHL   2,618,687
AMPLIFIER FOR RAIL FLAW DETECTOR MECHANISMS
Filed March 25, 1950   2 SHEETS—SHEET 2

INVENTOR.
ROBERT N. STRAEHL
BY
Joseph H. Lipshutz
ATTORNEY.

Patented Nov. 18, 1952

2,618,687

UNITED STATES PATENT OFFICE 2,618,687

AMPLIFIER FOR RAIL FLAW DETECTOR MECHANISMS

Robert N. Straehl, Danbury, Conn., assignor to Sperry Products, Inc., Danbury, Conn., a corporation of New York Application March 25, 1950, Serial No. 151,903

7 Claims. (Cl. 175—183)

This invention relates to rail flaw detector mechanisms, such as now employed on the Sperry rail flaw detector cars. These cars run along the railroad tracks and pass current continuously through the rails between spaced contact brushes to set up an electro-magnetic field surrounding the rail. Flaws in the rail caused by fissures are discovered by reason of the fact that they set up non-uniform regions in the said electro-magnetic field. Such non-uniformities are detected by means such as opposed induction coils maintained at a constant distance above the rail head, the coils normally cutting a constant number of lines of force, but on encountering a region of flaw they cut a different number of lines of force to generate a differential E. M. F. which, after being suitably amplified, may be caused to operate indicating means. Such indicating means may take the form of one or more pens operating on a moving chart within the car, and also a deposit of paint on the rail in the region of flaw by reason of the simultaneous operation of a paint gun.

As stated above, the signal which is generated by the flaw detecting means must be suitably amplified. The ideal requirements for such an amplifier include the following features:

1. It must have sufficient gain to amplify the signals from the search coils (flux responsive means) as they pass through the distorted flux pattern caused by a 10% or greater fissure with the detector car running at 5 miles per hour along the track with 3500 amperes of current flowing in the track, to a value sufficiently high, with a 50% safety factor, to operate the recording pen and paint marking device.

2. It must produce no output to the recording pen and paint marking system when the search coils pass through the distorted flux patterns caused by a fissure less than 10% with the car velocity along the track being between 5 and 15 miles per hour, and the track current 3500 amperes.

3. Regardless of car speed between the limits of 5 and 15 miles per hour, the output of the amplifier to the recording pen and paint marking system must have a fixed amplitude when the search coils pass through the distorted flux pattern caused by any fissure greater than 10%.

4. Regardless of the car speed between the limits of 5 and 15 miles per hour and the minimum time duration of signals from the detector coils as they pass through the distorted flux pattern produced by a 10% or greater fissure, the output of the amplifier shall produce a pulse of energy whose minimum time duration shall never fall below a predetermined value.

5. When the time duration of the signal from the search coils exceeds the minimum value set in item 4 above, the output pulse of the amplifier will be correspondingly longer.

6. The amplifier must not be subject to blocking following the application of large signals to its input terminals. "Blocking" is defined here to mean a period of reduced sensitivity or abnormal operating characteristics immediately following the application of a signal whose amplitude exceeds that which is considered normal for the circuit under question.

7. The amplifier must be provided with means for accepting a gating signal, the purpose of which is to render the amplifier inoperative or operative during the application of the signal. Furthermore, no transient responses in the output of the amplifier should be caused by the application or removal of the gating signal to the amplifier.

It is the principal object of this invention to provide an amplifier for a rail flaw detector mechanism, which will fulfill all of the requirements listed above.

Further objects and advantages of this invention will become apparent in the following detailed description thereof.

In the accompanying drawings.

Figure 1:
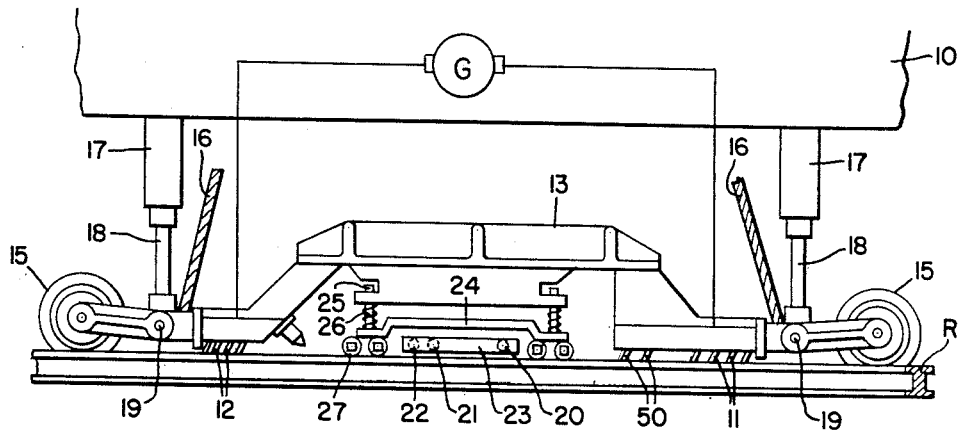
Fig. 1 is a side elevation of a portion of a Sperry rail fissure detector car having my invention applied thereto.
Figure 2:
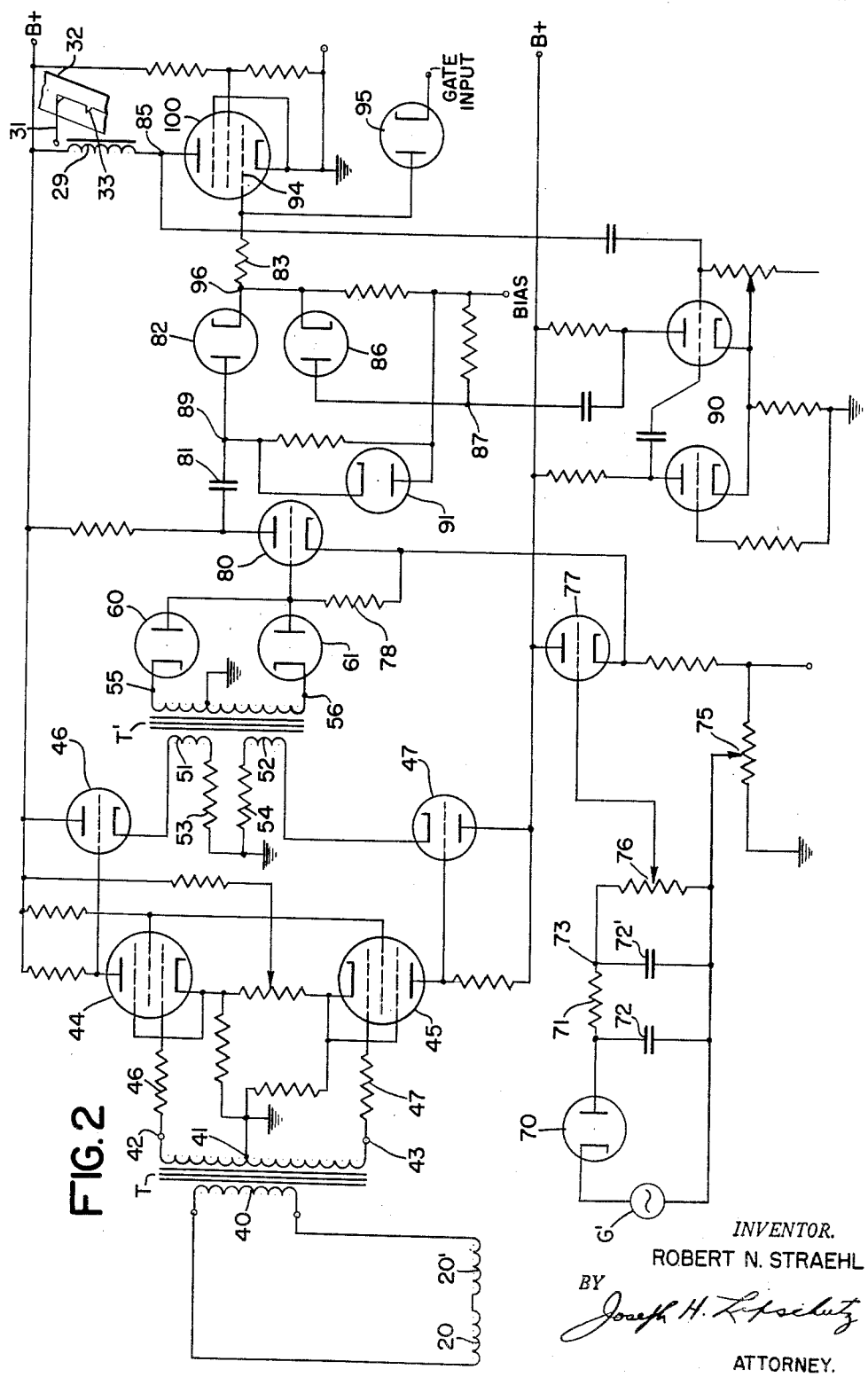
Fig. 2 is a wiring diagram illustrating the principle of this invention.

Referring to Fig. 1 of the drawings, there are shown the parts of a standard Sperry rail fissure detector car, which includes a car body 10 operating along the rails R. Fissure detection is accomplished by passing current through each rail from a generator G within the car body supplying current to spaced current brushes 11 and 12 supported upon the current brush carriage 13 which, when in lowered or effective position, is adapted to ride upon the rail by means such as wheels 15. The current brush carriage 13 is normally held in elevated or ineffective position by means of springs (not shown) and cables 16, but when it is desired to lower said carriage, fluid pressure such as compressed air is applied to the cylinders 17 to force out pistons 18 which are pivotally connected at 19 to the current brush carriage 13. The current passed through the rail by way of spaced brushes 11 and 12 will establish an electro-magnetic field surrounding the rail and this field will be uniform except in the region of flaw where it will be distorted. Such distortions of the electro-magnetic field are detected by a flaw responsive mechanism which may take the form of a plurality of pairs of induction coils 20, 21, 22 supported in a housing 23 at a constant distance above the rail surface by means of a carriage 24. Said carriage 24 is mounted on current brush carriage 13 by means of loosely fitting bolts 25 and springs 26 to permit said carriage 24, while riding on the rail on means such as wheels 27, to move independently of carriage 13 so that said carriage may at all times maintain parallelism with the rail surface regardless of irregularities thereof. The flaw responsive mechanism may include one or more pairs of coils, three such pairs 20, 21, 22 being shown in the present instance. Each pair of coils is connected in series and oppositely wound so that variations in flux which affect both simultaneously, such as variations in the current supplied or equal variations in the distance of the coils above the rail, will affect both equally and oppositely, and thus not affect the flaw detection. On entering a region of flaw, however, first one and then the other of said coils will cut a different number of lines of force from that which was previously cut to generate a differential E. M. F. These E. M. F.'s, after being amplified by the amplifier which will be more fully described in connection with Fig. 2, will energize a relay 29 to actuate a pen 31 which operates on a moving chart 32. A notch 33 thus formed in the straight line being drawn by the pen indicates the presence of a flaw.

Since a rail joint comprises angle bars, a plurality of bolts and bond wires, such bars will distort the electro-magnetic field surrounding the rail in the same manner as a fissure and, throughout the entire passage of the detector mechanism over the joint, indications would be coming through on the chart, causing continuous actuation of the pens, thus obscuring the chart and making it difficult to read. For this reason means are provided for cutting out the operation of the indicating means while the detector mechanism is passing through the region of flux affected by the joint. Various means are provided for this purpose, such as pivoted fingers which engage the gauge side of the rail as shown in Patent No. 2,069,030 to H. C. Drake, granted January 26, 1937, or it may take the form of a pair of potential contacts 50 which pick up a more than ordinary potential drop which occurs at the rail joint. The large potential drop at the joint is caused to generate a gating signal which serves to render the indicating means ineffective in a manner to be described hereinafter in connection with the description of Fig. 2.

As set forth hereinbefore, variations in the electro-magnetic field caused by the presence of a fissure are picked up by the pairs of induction coils 20, 21, 22 to generate signals which after being suitably amplified are caused to actuate the relay 29 to operate pen 31 on the chart 32 to give an indication, such as notch 33, of the presence of a fissure. The means for amplification of the signal picked up by the coils is disclosed in Fig. 2 which shows one amplifying channel for one pair of coils, such as, for example, coils 20. The amplification of the signal picked up by coil 20 is effected by the amplifier disclosed in Fig. 2 which embodies within it means whereby the desirable features listed in the introduction hereto can be obtained. For this purpose the signal voltage generated by the coils, such as coil 20, is applied to the primary winding 40 of a transformer T. The secondary of transformer T is provided with a center tap 41 so that the output voltage of the transformer arrives at point 42 180° out of phase with the voltage at point 43. The voltages at 42 and 43 are fed into tubes 44 and 45 through resistors 46 and 47 which serve to limit the input voltage to the respective tubes. The outputs of tubes 44 and 45 will comprise the original signal voltage greatly amplified and inverted. These outputs are delivered to cathode follower tubes 46 and 47 designed to reduce the impedance of the circuit. This makes the outputs suitable for transformer coupling through transformer T' which has a split primary in the form of two coils 51 and 52 in the circuit of which are resistors 53 and 54. The purpose of the split primary is to permit some unbalance in the cathode follower outputs to exist without drawing excessive D. C. current through the transformer winding. The secondary of transformer T' comprises a center tapped coil so that the outputs appear at points 55 and 56 opposite in phase.

It has been stated in the introduction that one of the principal features of an amplifier of this type is its ability to discriminate between fissures of a size which it is desired to detect and fissures of a smaller size which it is not desired to detect. Furthermore, it is desirable that this discrimination be made irrespective of the speed of the car, since the coils will generate a larger signal voltage when the car is moving at high speed than when it is moving at slow speed, even though the variation in the flux pattern is the same. In order to accomplish this result there is provided the following arrangement. The outputs from transformer T' are fed to diode tubes 60 and 61, and it will be seen that if a voltage can be placed on the plates of such diodes equal to the voltage generated by the minimum size fissure which it is desired to detect, then these diode tubes would become conductive only in the event that the detector coils generated voltages which on reaching the diodes were of greater magnitude than the voltages placed upon the plates of the diodes. Thus, if the smallest size fissure which it is desired to detect is a 10% fissure which generates a certain voltage, then a voltage corresponding to such fissure is placed upon the plates of the diodes and hence only fissures of a value in excess of this 10% size will generate sufficient voltage which after being amplified will arrive at the diodes at a magnitude such as to render the diodes conductive. Furthermore, the voltage placed upon the diode plates must take into consideration the varying speed of the car.

To accomplish the above result there is provided a tachometer circuit which may comprise a generator G', driven from the car axle and which therefore will generate a voltage that is proportional to the speed of the car. This voltage is rectified by a rectifier 70 and is filtered by filter combination including resistor 71 and capacitors 72 and 72' so that a DC voltage arrives at point 73 which is a function of the car speed. Experimental data from operation of the detector cars indicate that detector coil output voltage is not directly proportional to car speed but to some more complex function of car speed. An approximation of this function is made by setting of a potentiometer 75. A potentiometer 76 permits the desired proportion of the generated voltage to be delivered to a cathode follower 77 whose output is applied to the plates of diodes 60 and 61 through a resistor 78. It will now be seen that a voltage corresponding to the 10% fissure voltage may be applied to the plates of the diode and this voltage will automatically be varied to correspond to the speed of the car. It will thus be seen that only fissures in excess of the minimum, in the example chosen, a 10% fissure, will be effective in causing current to flow through the diodes 60 and 61 and therefore only these fissures in excess of the minimum will be effective in operating relay 29.

It will be seen that up to this point, namely up to the point where the voltages have passed through the discriminator (T', 60, 61, 78), no capacitors have been employed, with the resultant absence of recovery time following clipping in the amplifier.

The outputs from the diodes 60 and 61 are fed into the input of amplifier tube 80 which is designed to yield high amplification namely very high gain in a high gain circuit. The output from amplifier tube 80 is connected to the final output tube 100 through a coupling condenser 81 and a diode 82 whose function will be described hereinafter, and through a resistor 83 which serves to clip excessive outputs and limit the output of the tube to a value not greater than a predetermined fixed amplitude. Thus no matter how great the signal arriving at tube 100, the output will be limited to a fixed maximum.

Another desirable feature of the amplifier as stated in the introduction hereto, is that even though the signal be of extremely short duration it should operate the indicating means for at least a predetermined minimum length of time. For this purpose, if the output from tube 100 at point 85 is of sufficient magnitude it is caused to trip a multi-vibrator, indicated generally at 90, to cause the multi-vibrator to generate a pulse which is applied to the input electrode 94 of tube 100 by way of diode 86. Therefore, once an output from tube 100 reaches the predetermined magnitude the multi-vibrator 90 will generate a pulse which will be sufficient to keep the tube generating an output for a predetermined length of time, even though the period of the original pulse is extremely short. If the signal generated by the defect is of longer duration than the multi-vibrator pulse, then the multi-vibrator can restore itself at the end of its pulse due to the isolating action of diode 86 when its current is cut off because its cathode becomes positive with respect to its anode.

If the signal from tube 80 ends before the multi-vibrator pulse ends then diode 82 is cut off. Under this condition diode 82 cuts off and permits point 89 to fall to a lower potential than point 96. This is essential for mixing the signals at the grid of tube 100 and to prevent the trailing edge of the initiating signal from prematurely restoring the multi-vibrator.

Diode 82 current would normally cause some charge to accumulate on coupling condenser 81, which under severe conditions could conceivably bias off the diode 82 and reduce the grid signal to tube 100. To prevent this action from taking place a diode 91 is provided which in effect appears as a short circuit when the voltage at point 89 attempts to become negative with respect to the plate of diode 91.

As stated in the introduction hereto, it is necessary to render the indicating means ineffective during that interval when the detector coils are passing over the region of flux affected by the joint. Therefore, there is provided as shown here, a pair of potential contacts 50 which generate a relatively large signal when they span the meeting edges of the rails at a joint and this signal is employed to gate the amplifier to render its output ineffective to actuate the indicating means. It is desirable that in gating the amplifier no transients be produced in the output. For this purpose the signal generated at the joint is passed through a diode 95 and applied to the electrode 94 of tube 100. The tube 100 is normally biased below cut-off and the gating signal applied to this electrode serves to maintain the tube well below cut-off even when relatively large signals are produced at point 96.

Having described my invention, what I claim and desire to secure by Letters Patent is:

1. In a rail flaw detector car comprising means for energizing the rail with flux, means responsive to variations in said flux and adapted to generate signal voltages, an amplifier having means for amplifying said signal voltages, means for generating a predetermined voltage which is a function of the speed of the car, means for opposing said last-named voltage against the amplified signal voltages, said opposing means comprising a diode having a cathode and an anode, means for applying the amplified signal voltages to the diode in one direction, means for applying the generated predetermined voltage to the diode in the opposite direction, and indicating means actuated by the signal voltages in excess of said predetermined voltage.

2. In a rail flaw detector car comprising means for energizing the rail with flux, means responsive to variations in said flux and adapted to generate signal voltages, an amplifier having means for amplifying said signal voltages, means for generating a predetermined voltage which is a function of the speed of the car, means for opposing said last-named voltage against the amplified signal voltages, said opposing means comprising a diode having a cathode and an anode, means for applying the amplified signal voltages to the diode in the direction of cathode to anode, means for applying the generated predetermined voltage to the diode in the direction of anode to cathode, and indicating means actuated by the signal voltages in excess of said predetermined voltage.

3. In a rail flaw detector car comprising means for energizing the rail with flux, means responsive to variations in said flux and adapted to generate signal voltages, an amplifier having means for amplifying said signal voltages, said amplifier including a final stage amplifying tube having a cathode, anode and grid, means for applying the signal voltage to said grid, a multi-vibrator adapted to generate a pulse of predetermined duration when tripped by a voltage of at least predetermined magnitude, means whereby the output of the amplifier is connected to the input of the multi-vibrator whereby any voltage of at least said predetermined magnitude will trip the multi-vibrator, and means for applying the multi-vibrator output to the grid of said final stage tube 4. In a rail flaw detector car comprising means for energizing the rail with flux, means responsive to variations in said flux and adapted to generate signal voltages, an amplifier having means for amplifying said signal voltages, said amplifier including a final stage amplifying tube having a cathode, anode and grid, means for applying the signal voltage to said grid, a multi-vibrator adapted to generate a pulse of predetermined duration when tripped by a voltage of at least predetermined magnitude, means whereby the output of the amplifier is connected to the input of the multi-vibrator whereby any voltage of at least said predetermined magnitude will trip the multi-vibrator, and means for applying the multi-vibrator output to the grid of said final stage tube, said last-named means including a diode having an anode and a cathode, the multi-vibrator output being applied to the diode anode, the diode cathode being connected to the grid of said final stage tube, whereby the diode will be cut off when the multi-vibrator pulse ends and an input signal voltage of longer duration than the pulse will continue to energize the grid of the final stage tube.

5. In a rail flaw detector car comprising means for energizing the rail with flux, means responsive to variations in said flux and adapted to generate signal voltages, an amplifier having means for amplifying said signal voltages, said amplifier including a final stage amplifying tube having cathode, anode and grid, means for applying the signal voltage to the grid, said last-named means including a diode having a cathode and an anode, the signal voltage being applied to the diode anode, a multi-vibrator adapted to generate a pulse of predetermined duration when tripped by a voltage of at least predetermined magnitude, means whereby the output of the amplifier is connected to the input of the multi-vibrator whereby any voltage of at least said predetermined magnitude will trip the multi-vibrator, and means for applying the multi-vibrator output to the grid of said final stage tube, said diode being cut off when the signal voltage ends without interfering with the continued delivery of multi-vibrator output to the grid of said final stage tube if the signal voltage is of shorter duration than the pulse.

6. In a rail flaw detector car comprising means for energizing the rail with flux, means responsive to variations in said flux and adapted to generate signal voltages, an amplifier having means for amplifying said signal voltages, said amplifier including a final stage amplifying tube having cathode, anode and grid, means for applying the signal voltage to the grid, said last-named means including a diode having a cathode and an anode, the signal voltage being applied to the diode in the direction of anode to cathode, a multi-vibrator adapted to generate a pulse of predetermined duration when tripped by a voltage of at least predetermined magnitude, means whereby the output of the amplifier is connected to the input of the multi-vibrator whereby any voltage of at least said predetermined magnitude will trip the multi-vibrator, and means for applying the multi-vibrator output to the grid of said final stage tube, said last-named means including a diode having an anode and a cathode, the multi-vibrator output being applied to said last-named anode, the last-named cathode being connected to the grid of said final stage tube, whereby said second diode will be extinguished when the multi-vibrator pulse ends and an input signal of longer duration than the pulse will continue to energize the grid of the final stage tube, said first diode being cut off when the signal voltage ends without interfering with the continued delivery of multi-vibrator output to the grid of said final stage tube if the signal voltage is of shorter duration than the pulse.

7. In a rail flaw detector car comprising means for energizing the rail with flux, means responsive to variations in said flux and adapted to generate signal voltages, an amplifier having means for amplifying said signal voltages, said amplifier including a tube having cathode, anode and grid, means for biasing the tube to cut-off, means for applying the signal voltages to the grid of said tube, said car having means adapted to generate a signal voltage in response to rail joints, means for applying said last-named signal voltages to the grid of said tube, a uni-lateral device adapted to be connected at one side to the input of said tube, said last-named signal being adapted to be applied to the other side of said device to render the device conductive to maintain said tube cut-off while said device is conductive.

ROBERT N. STRAEHL.

REFERENCES CITED

The following references are of record in the file of this patent:

UNITED STATES PATENTS

| Number | Name | Date |
| --- | --- | --- |
| 1,944,954 | Sperry | Jan. 30, 1934 |
| 2,133,687 | Drake | Oct. 18, 1938 |
| 2,223,371 | Keevil | Dec. 3, 1940 |
| 2,264,873 | Cockrell | Dec. 2, 1941 |
| 2,467,328 | Mesh | Apr. 12, 1949 |
| 2,479,219 | Drake | Aug. 16, 1949 |
| 2,481,858 | Mesh | Sept. 13, 1949 |
| 2,488,277 | Falk et al. | Nov. 15, 1949 |
| 2,540,870 | Farmer | Feb. 6, 1951 |